US008265969B2

(12) United States Patent
Comstock et al.

(10) Patent No.: US 8,265,969 B2
(45) Date of Patent: Sep. 11, 2012

(54) POLICY-BASED MANAGEMENT OF DATA ELEMENTS IN A DOCUMENT SCHEMA FOR DATA TRANSACTIONS

(75) Inventors: Jeff Comstock, Hellerup (DK); Edvardas V. Budrys, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1427 days.

(21) Appl. No.: 11/561,290

(22) Filed: Nov. 17, 2006

(65) Prior Publication Data

US 2008/0120685 A1    May 22, 2008

(51) Int. Cl.
G06F 9/44    (2006.01)
(52) U.S. Cl. .......................................... 705/7.11; 726/1
(58) Field of Classification Search .................. 705/7.11; 726/1
See application file for complete search history.

(56) References Cited

U.S. PATENT DOCUMENTS

| | | | |
|---|---|---|---|
| 4,025,827 A * | 5/1977 | Pellerin et al. ................. | 361/519 |
| 6,507,875 B1 | 1/2003 | Mellen-Garnett et al. | |
| 6,754,672 B1 | 6/2004 | McLauchlin | |
| 6,862,573 B2 * | 3/2005 | Kendall et al. ................. | 705/7.11 |
| 7,047,488 B2 | 5/2006 | Ingersoll et al. | |
| 7,542,930 B1 * | 6/2009 | O'Leary et al. .................. | 705/35 |
| 7,839,875 B1 * | 11/2010 | Masputra et al. .............. | 370/412 |
| 2002/0138449 A1 * | 9/2002 | Kendall et al. .................... | 705/75 |
| 2003/0036966 A1 | 2/2003 | Amra et al. | |
| 2003/0200234 A1 * | 10/2003 | Koppich et al. ................ | 707/203 |
| 2003/0229543 A1 * | 12/2003 | Zimmerman et al. ........... | 705/26 |
| 2004/0010496 A1 | 1/2004 | Behrendt et al. | |
| 2004/0028212 A1 | 2/2004 | Lok et al. | |
| 2005/0049938 A1 | 3/2005 | Venkiteswaran | |
| 2005/0149726 A1 * | 7/2005 | Joshi et al. ..................... | 713/164 |
| 2005/0171980 A1 | 8/2005 | Fernandez et al. | |
| 2005/0192830 A1 * | 9/2005 | Pugh et al. ........................ | 705/1 |
| 2005/0197920 A1 | 9/2005 | Weir et al. | |
| 2005/0209876 A1 * | 9/2005 | Kennis et al. ...................... | 705/1 |
| 2005/0251853 A1 * | 11/2005 | Bhargavan et al. ............... | 726/1 |
| 2006/0133412 A1 | 6/2006 | Callaghan | |
| 2006/0190544 A1 | 8/2006 | Chikirivao et al. | |
| 2007/0058561 A1 * | 3/2007 | Virgile .......................... | 370/252 |
| 2007/0143827 A1 * | 6/2007 | Nicodemus et al. .............. | 726/2 |
| 2007/0174610 A1 * | 7/2007 | Furuya et al. ................. | 713/167 |
| 2008/0209505 A1 * | 8/2008 | Ghai et al. ........................ | 726/1 |

OTHER PUBLICATIONS

"Rights of Passage", by Robert Mitchell, Computerworld Inc., Jul 4, 2005.*
"B2B Contract Implementation using Windows DNS", by Ning He, and Zoran Milosevic, (hereinafter: "Ning He"), The University of Queensland, QLD4072, Australia. IEEE, 2001.*
"B2B Contract Implementation using Windows DNS", by Ning He, and Zoran Milosevic, The University of Queensland, QLD 4072, Australia. IEEE, 2001.*

(Continued)

Primary Examiner — Lynda Jasmin
Assistant Examiner — Pan Choy

(57) ABSTRACT

A framework and method for managing business data transactions resides outside individual business systems and allows creation of a policy for classification of each data element for all data schema in transit between processes. The framework allows identification of data sets by document type and endpoint, so that individual data elements of a schema can be validated, and edited or deleted if necessary, during their transit between endpoints, such as between trading partners. Because the policy is built and enforced outside the individual endpoint business systems, expensive customizations within each transactional system are avoided.

20 Claims, 9 Drawing Sheets

OTHER PUBLICATIONS

"Managing Security Policy in a Large Distributed Web Services Environment", by Symon Chang, Qiming Chen, and Meichun Hsu, Commerce One Inc., Proceedings of the 27th Annual International Computer Software and Applications Conference, 2003.*

"Rights of Passage", by Robert Mitchell, Computerworld Inc., Jul. 4, 2005.*

"Using XML in Application Integration", by Andre Yee; Apr. 17, 2000; SOA Management, eBizQ.*

"XML-Based Integration Techniques", by Kirstan Vandersluis, ISBN 1931644020; 2004; http://www.devx.com/xml/article/21327/1954.*

"Composition of Transformations for XML Schema Based Documents", by Johann Eder and Marek Lehmann, University of Klagenfurt, Dept. of Informatics-Systems; Proceedings of Short Papers of the 7th East European Conference on Advances in Databases and Information System; 2003, pp. 38-47.*

"A Guide to Building Secure Web Applications and Web Services", 2.0 Black Hat Edition; by Adrian Wiesmann et al., 2005.*

"Using XML Transformation for Enterprise Architectures", by A. Stam et al., 2004; LIACS, Leiden University, The Netherlands; http://citeseerx.ist.psu.edu/viewdoc/summary?doi=10.1.1.66.5183.*

"Policy Based Enterprise (Active) Information Integration", by Mukesh Mohania and Inderpal Narang; IBM India Research Lab, IBM Almaden Research Lab, San Jose, CA, USA; pp. 1-7, 2003.*

Flurry et al., "The IBM Application Framework for e-business", IBM Systems Jourlan, vol. 40, No. 1, 2001, http://researchweb.watson.ibm.com/journal/sj/401/flurry.pdf.

Chang et al., "Managing Security Policy in a Large Distributed Web Services Environment" IEEE. 2003, http://ieeexplore.ieee.org/iel5/8813/27898/01245404.pdf?isNumber=.

He et al., "B2B Contract Implementation using Windows DNS", IEEE, 2001, http://delivery.acm.org/10.1145/550000/545629/p71-he.pdf?key1=545629&key2=7256296511&coll=portal&dl=GUIDE&CFID=813305&CFTOKEN=77298530.

Herring et al., "Implementing B2B Contracts Using BizTalk", http://citeseer.ist.psu.edu/cache/papers/cs/27874/http:zSzzSzwww.charles-herring.comzSzHICSS34-B2B.pdf/milosevic01implementing.pdf.

* cited by examiner

POLICY-BASED MANAGEMENT OF DATA ELEMENTS IN A DOCUMENT SCHEMA FOR DATA TRANSACTIONS

BACKGROUND

The rapid growth of electronic business support tools has increased the efficiency and responsiveness of business both on a local level and globally. Enterprise resource planning (ERP) systems, business automation tools, customer relationship management (CRM) tools, warehouse and inventory management systems, business-to-business (B2B) and business to consumer (B2C) auctions are all examples of categories of electronic business tools. Hundreds, if not thousands, of implementations of these tools are commercially available along with 'homegrown' versions of these and other tools. Message-based systems and queue-based systems, web services, as well as direct feeds, can be used to connect these tools to each other for information sharing and integration of tasks.

The actual integration of these tools can be a significant effort, both in initial setup and in maintenance, as endpoint tools change versions or are replaced. The endpoints for data-based transactions can be internal to an enterprise, such as between a sales order processing system and a manufacturing planning system. Other endpoints can be between internal and external entities, such as a corporate purchasing system and a supplier sales order processing system. The information available to a given system is likely to be well beyond the needs of an individual transaction. For example, the corporate purchasing system is likely to have access to corporate sales information, competitive pricing, supplier contract status, overseas vendors, and more. However, a purchase order sent to the supplier sales order processing system may need little more than a part number, quantity, ship-to address, and volume purchase agreement reference. Care must be taken when developing the interfaces between systems that all the required data and none of the additional data are present when a data-based transaction leaves the sphere of control of the sending system, be it an internal boundary or an inter-enterprise boundary.

XML, or extended markup language, and the associated XSD, or XML schema definition, have brought marked improvements to inter-process collaboration by creating self-defining documents that are not bound to rigorous bit-level formatting conventions. However, XML does little or nothing to prevent transmission of unneeded, unwanted, or privileged information between business data endpoints.

SUMMARY

A business framework for validating and amending data of electronic transactions between specified endpoints is based on a policy engine that extracts data field information from XML documents and creates a data policy document. The policy may be created via a user interface for setting requirements for each data element in a schema, such as to include or exclude, or to place limits on the data of a given schema element. A given policy may correspond to business documents having a given schema that are in transit between defined endpoints. Because a given schema defines a particular document type, the policy is defined by document type and the source and destination endpoints. The endpoints may be one-to-one or one-to-many, depending on the document type and the business requirement.

The policy may be applied to both inbound and outbound data. When data is inbound, it may be validated as coming from an approved source endpoint and may be further validated as containing data required by the policy before being relayed to the destination endpoint. Outbound data may be validated as being directed to an approved destination endpoint and may be screened to ensure that it contains only data permitted for release to that endpoint. Should non-permitted data be found, it may be removed from the outbound data.

The policy engine may present a simple tool for creation and maintenance of business data policies that can be created or updated without making changes to either endpoint system. Endpoints can be changed, added, or removed as trading partners and internal support teams change relationships. Thus, identical transactions between internal and external support teams or trading partners may be generated by a business application, but the actual data sent may be tailored by the policy engine according to destination in conjunction with a corresponding policy rather than by expensive customizations to the business application.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
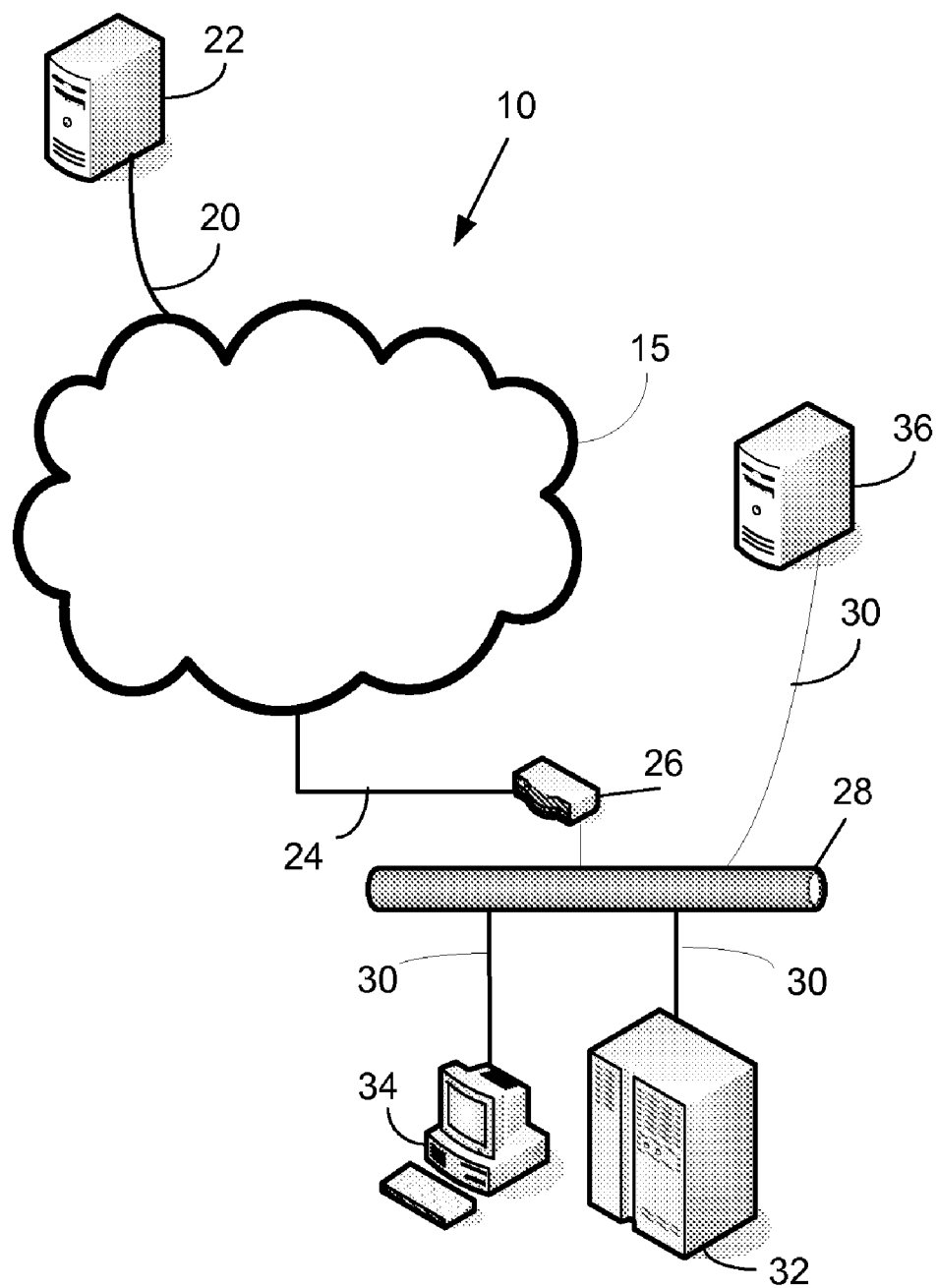
FIG. 1 is a simplified and representative network.

FIG. 1 illustrates a network environment 10 that may be used to in transacting electronic business. A network cloud 15 may support a wide area network connections, such as the Internet. A network 20 coupled to the network cloud 15 may connect an individual computer 22 that may be, for example, an electronic business transaction endpoint. Another network 24 may be coupled to the network cloud 15 and to a local area network 28 via a network interface 26. The network interface 26 may be a proxy server and may incorporate a firewall or other network security device. In another embodiment, the network interface 26 may be a simple data modem. Coupled to the local area network 28 may be a variety of individual subnets 30 coupled to a server 32 a personal computer 34 and an application server 36. The server 32 may also host business applications. In the description below, any of the computers 22, 32, 34, 36 may be valid endpoints for business data transactions. In this exemplary embodiment, transactions between computer's 30 to 34 and 36 may be considered internal transactions or transactions between computer 22 and any other computer would be considered an external transaction. Boundaries between computers or systems may be defined at the process level, the computer level or the network level. Setting a boundary for a given business data transaction may depend on the nature of the transaction and the relationship between the source and destination endpoints, as discussed in more detail below.

Figure 2:
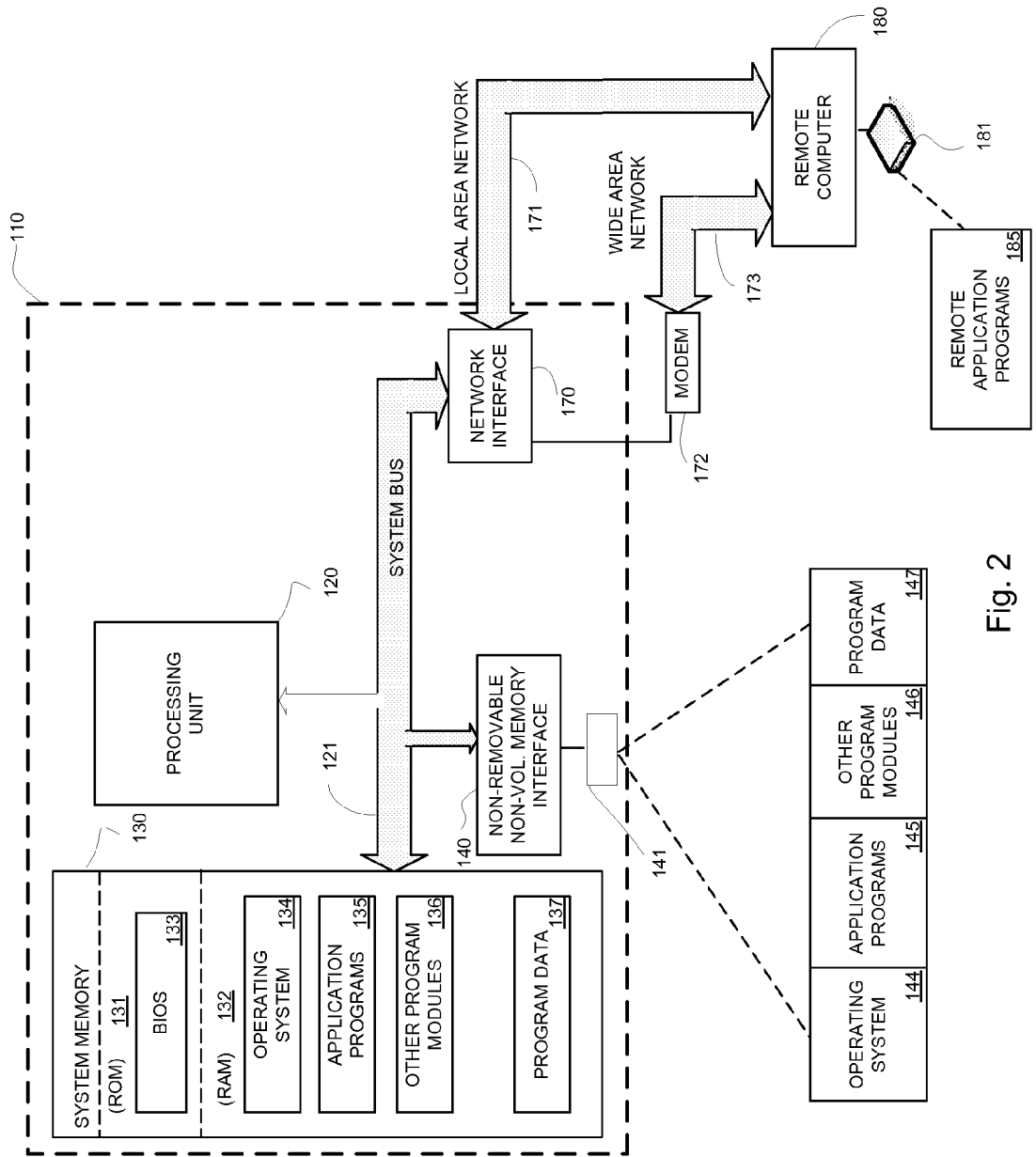
FIG. 2 is a simplified and representative block diagram of a computer suitable to implement an embodiment of the business document data policy.

FIG. 2 illustrates a computing device in the form of a computer 110 that may host one or more of the embodiments of the current disclosure and is discussed in detail to provide a context for subsequent discussions.

Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 (telephone, cable, DSL, etc.) or other means for establishing communications over the WAN 173, such as the Internet. The modem 172, which may be internal or external, may be connected to the system bus 121, the network interface 170, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. Such remote application programs may include business systems involved in electronic business transactions as are discussed in more detail below. It will be appreciated that the network connections shown are exemplary and other means of establishing a communications link between the computers may be used.

Figure 3:
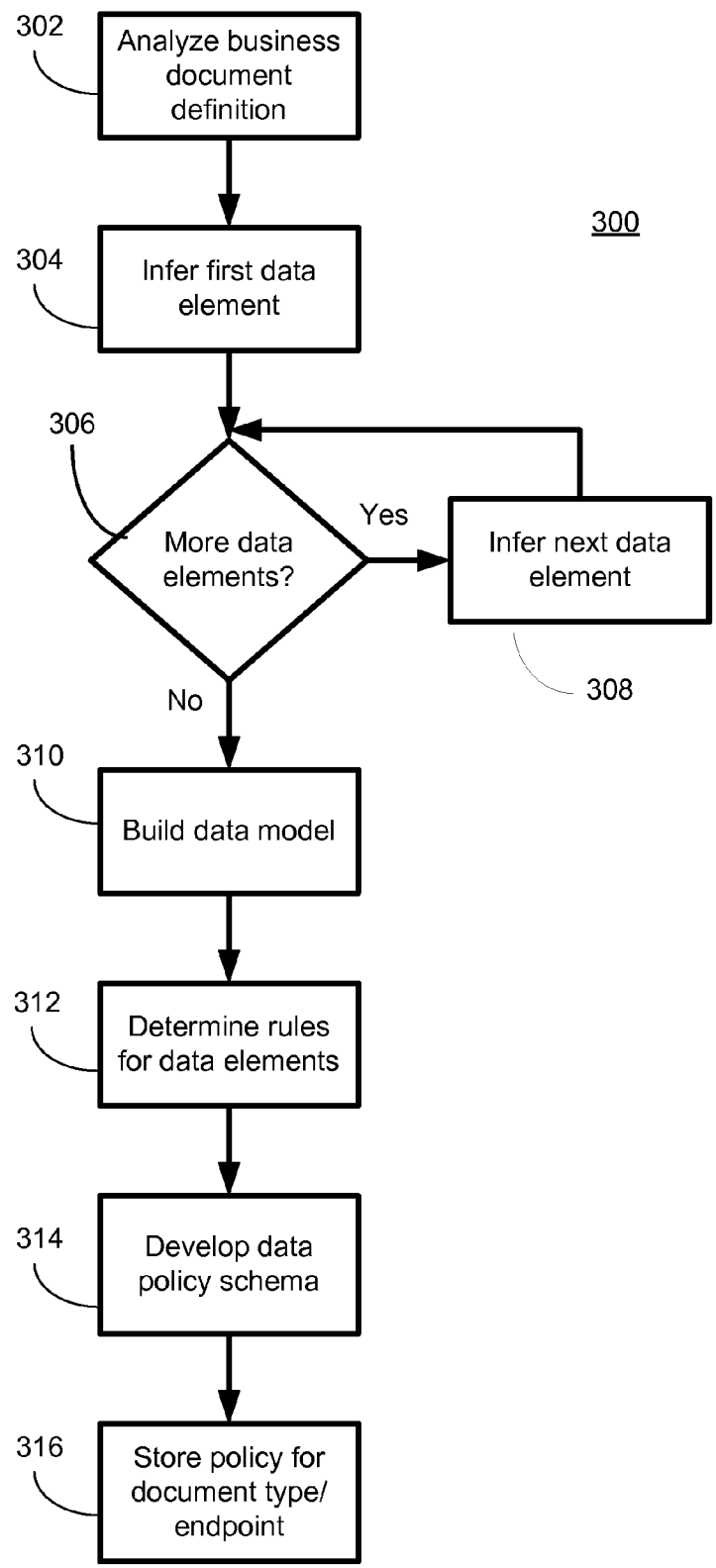
FIG. 3 is a method of developing a business document data policy.
Figure 4:
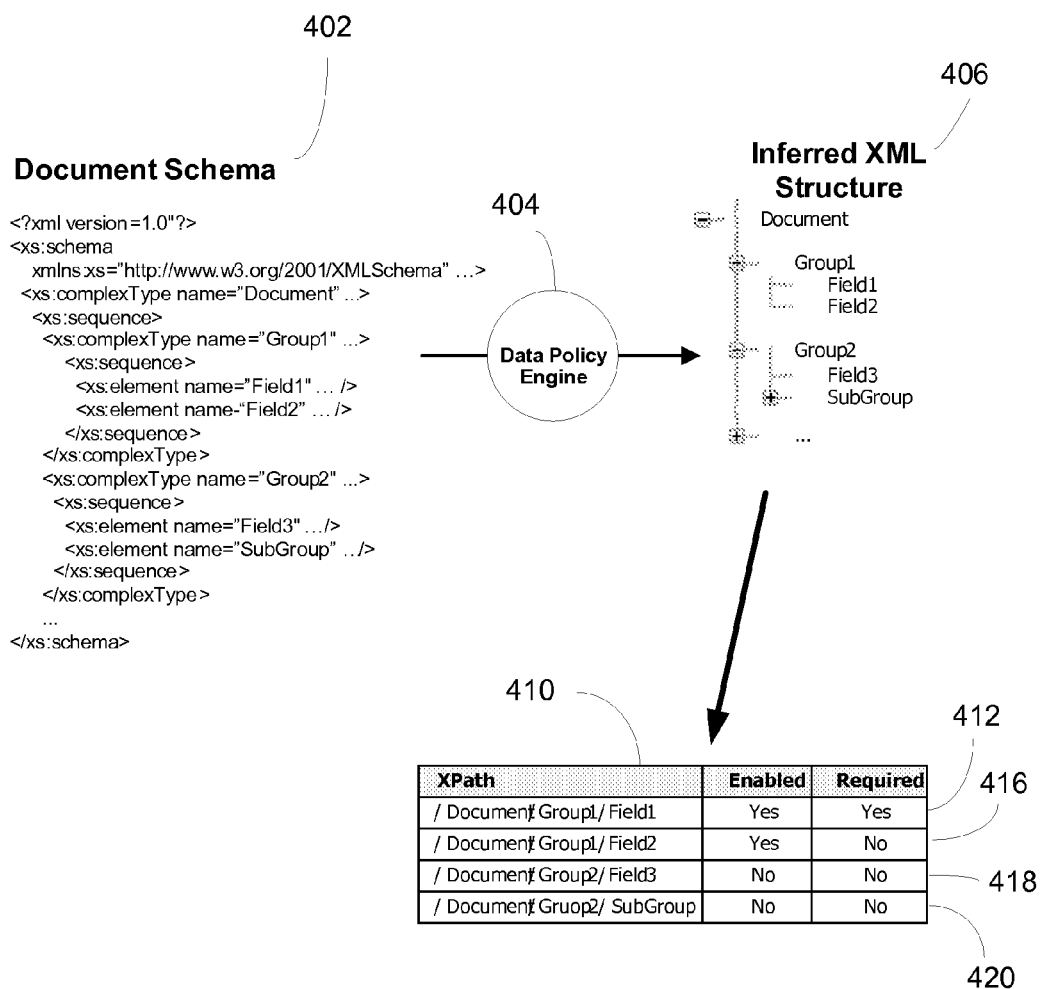
FIG. 4 illustrates the method of FIG. 3.

Referring to FIG. 3, a method 300 of developing a business application data policy is discussed and described. At block 302, a business document, such as an XML schema, may be analyzed for document definition, that is, the type of document by structure and origin. The document schema may be representative, or may be an actual document from a live or simulated business transaction. Referring briefly to FIG. 4, a representative document schema 402 is shown. The document schema 402 has various identifying information and definitions, as well as data elements identified by name. Returning to FIG. 3, at block 304 a data policy engine, such as data policy engine 404 of FIG. 4, may begin to identify data elements from the document schema 402. The process may continue at block 306 where it may be determined if additional elements of the document schema 402 are present. If so, processing may continue by following the 'yes' branch from block 306 to block 308 for the next data element to be processed. When all the data elements of the document schema 402 have been identified, the 'no' branch from block 306 may be followed to block 310 and a data model may be built representing the business document. FIG. 4 illustrates an inferred XML structure 406 shown in a tree representation based on the original document schema 402.

At block 312, rules for each data element may be determined. This may be accomplished through a variety of mechanisms, for example, in one embodiment a table may be presented via a user interface supported by the data policy engine 404 and a user may simply select one or more characteristics for each data element. FIG. 4 illustrates such an exemplary table 410 with one row for each inferred data element by group. The row for Field 1 412 is shown as being enabled and required. The row for Field 2 416 is shown as being enabled but not required. The rows for Field 3 418 and the SubGroup 420 are shown as not being enabled and are therefore also not required.

Table 1, below, illustrates a similar table having further data classifications that may be representative of other embodiments of the business data policy. In this example, a Range column has been added, as well as a Restricted column. For Field 1, the range has been restricted to any number of alpha characters, while Field 2 is shown as being restricted to values of red, green, or blue. Other columns, ranges, or restrictions may be used depending on the particular API and associated endpoints.

TABLE 1

| XPath - endpoint1:endpoint2 | Enabled | Required | Range | Restricted |
|---|---|---|---|---|
| /Document/Group 1/ Field 1 | Yes | Yes | [a-z; A-Z]* | No |
| /Document/Group 1/ Field 2 | Yes | No | No | Red\|Green\| Blue |
| /Document/Group 2/ Field 3 | No | — | — | — |
| /Document/Group 1/ SubGroup | No | — | — | — |

Another mechanism for capturing rules related to a particular may be used, for example, a inference engine may look at similar policies and seed data classifications from equivalent or similar data fields, endpoints, or both.

Figure 5:
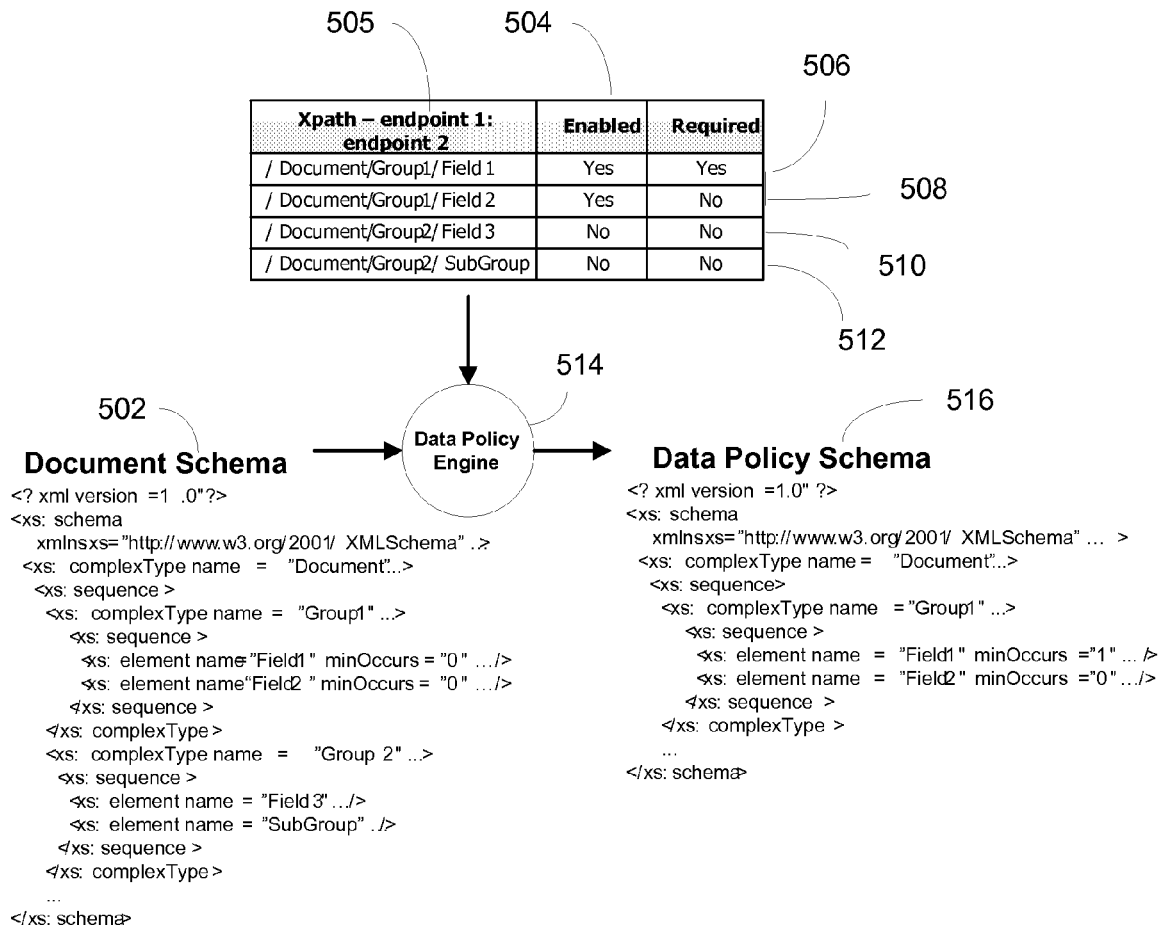
FIG. 5 is a further illustration of the method of FIG. 3.

At block 314, endpoint data may be added to identify which data paths are applicable for the given policy rules. Each policy rule set may apply to one or more document type/endpoint group. Referring now briefly to FIG. 5, the table 504 built at block 312 of FIG. 3, with endpoint data 505 and individual Field rows 506, 508, 510, 512 may be used by the data policy engine 514 to create a data policy schema 516 from the document schema 502. Note that even though the document schema 502 specifies that Field 1 is optional (minOccurs="0"), because the policy rules at row 506 require Field 1, the data policy schema 516 reflects that Field 1 is a required element (minOccurs="1"). Because the Field 3 and the SubGroup elements are not enabled, the individual Field 3 and SubGroup elements are not shown in the data policy schema 516. Further, because Group 2 now has no elements, it has also been removed from the data policy schema 516.

When this data policy schema 516 is subsequently applied to a document, those elements associated with Group 2, if present, may be removed or the document may simply be rejected. Also, if Field 1 is not present in the document, the document may be rejected and not further processed or passed to its destination endpoint.

Returning to FIG. 3, at block 316, the data policy schema developed at block 314, for example, data policy schema 516 of FIG. 5, may be stored for subsequent use in processing business documents in transit between end points. This general process may be repeated for each endpoint pair and document type for which data validation and processing is desired. Each data policy schema may be identified by endpoint pair and document type when being stored. Depending on the network architecture and a particular business implementation, the various data policy schema may be stored together, or may be stored separately according to various criteria, such as, network topology or use of a one set of policy schema for inbound data and another set of policy schema for outbound data.

Figure 6:
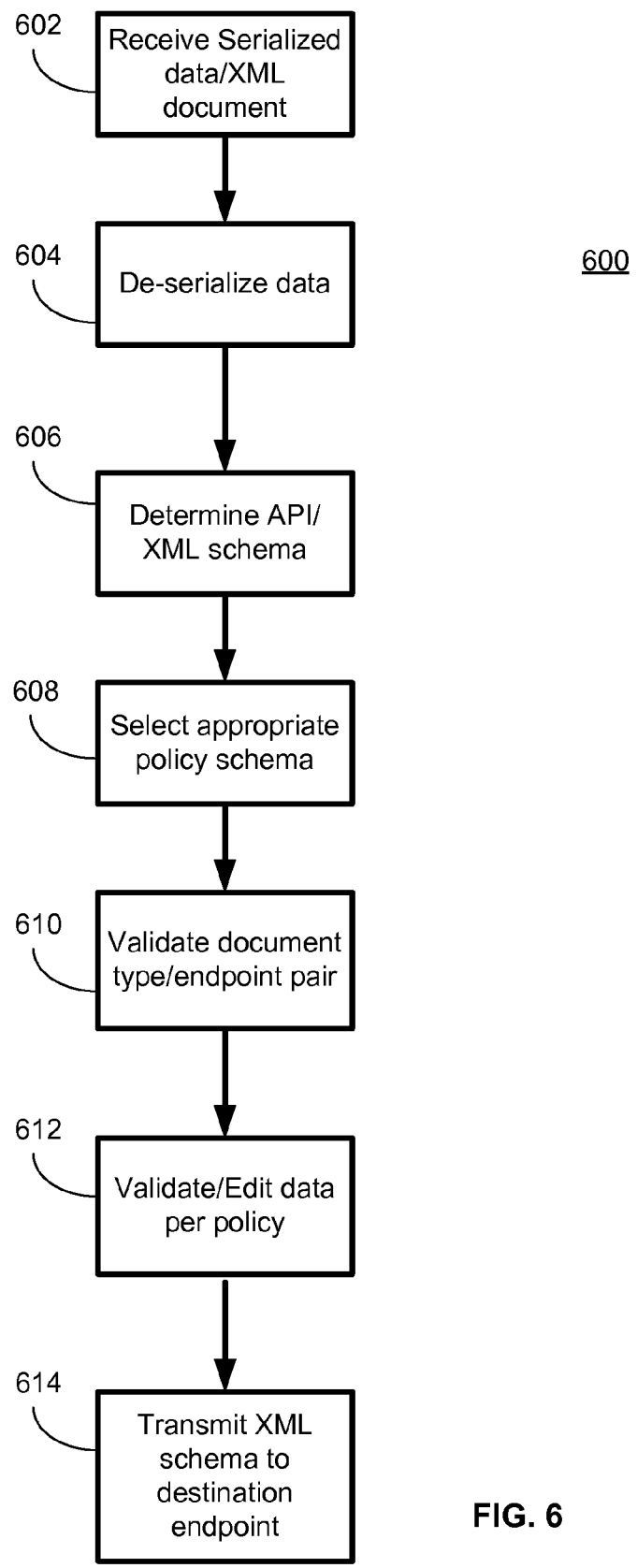
FIG. 6 is a method of applying a business document data policy to incoming data.
Figure 7:
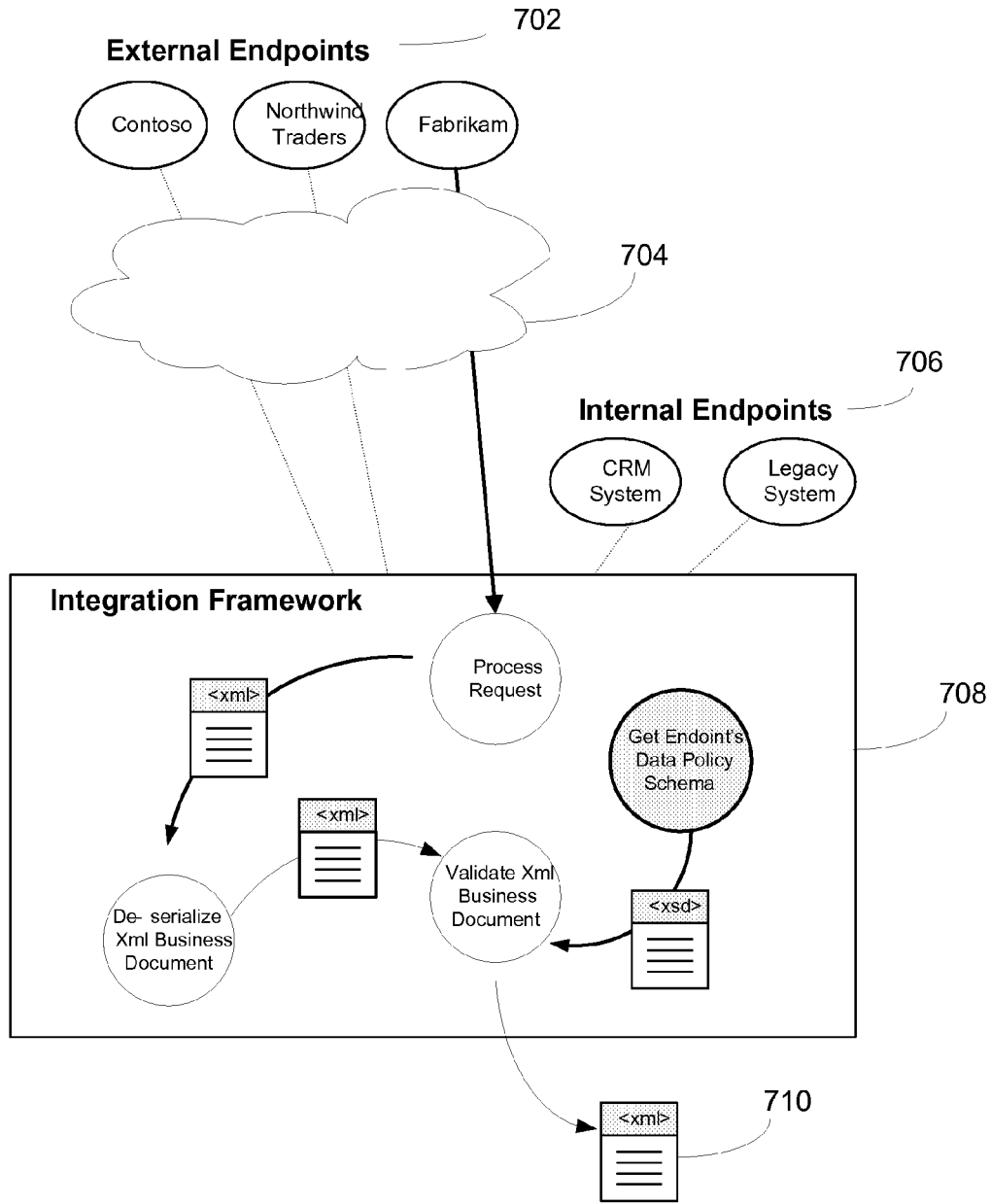
FIG. 7 is an illustration of the method of FIG. 6.

FIG. 6 is a method 600 of applying a business application data policy to incoming data. At block 602, serialized data or an XML document may be received from either external endpoints or internal endpoints. Referring briefly to FIG. 7, representative external endpoints 702 may be connected by a network cloud 704 to an integration framework 708 that may incorporate one or more processes executing a business application policy engine. Internal endpoints 706 may be directly connected to the integration framework 708. Data crossing the boundary of the integration framework 708 may be subject to validation or qualification by the data policy engine.

At block 604 of FIG. 6, serialized data may need to be de-serialized before further processing is done. At block 606 the document type, for example a particular XML schema, may be determined by examining information in the document. Additionally, endpoint information may be explicitly extracted from data in the document, or may be concluded by network information available with the document, for example, Internet protocol (IP) addresses in a transport header. When the appropriate document type and endpoint information has been determined, an appropriate data policy schema may be selected at block 608.

At block 610, the data policy schema selected may be used to validate that the particular document type is appropriate for use between the identified endpoints. If allowed, processing may continue at block 612. The data may be validated to determine that all required elements are present and that the contents meet defined criteria. Optionally, elements that are not enabled (i.e. authorized) may be removed. When all the data elements have been validated or edited, at block 614, the document may be transmitted to its destination endpoint, as depicted in FIG. 7 by document 710. If the document type/ endpoints are not allowed or required data elements are not present or not valid in the document itself, the received document may be discarded and, optionally, an error message sent to the source endpoint, the destination endpoint, or both.

Figure 8:
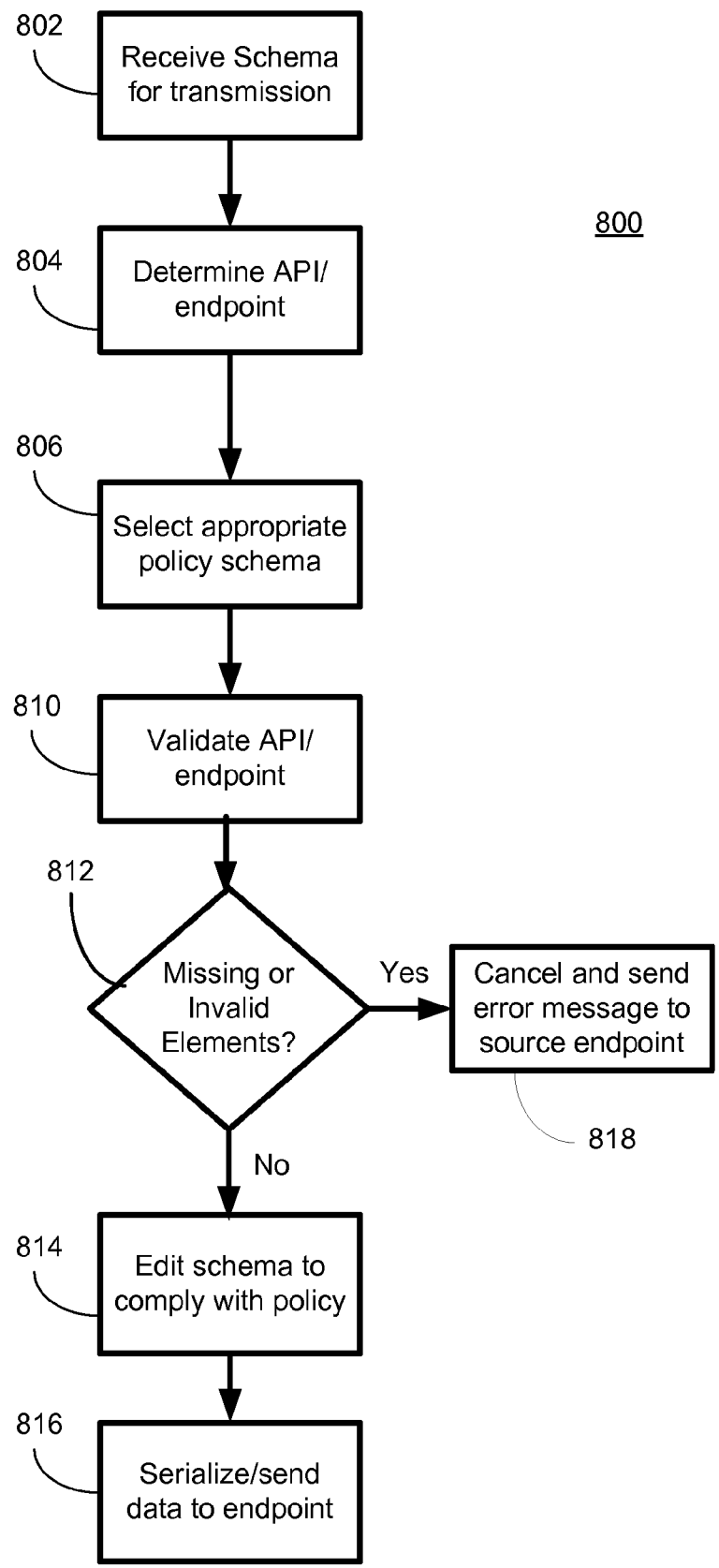
FIG. 8 is a method of applying a business document data policy to outgoing data.
Figure 9:
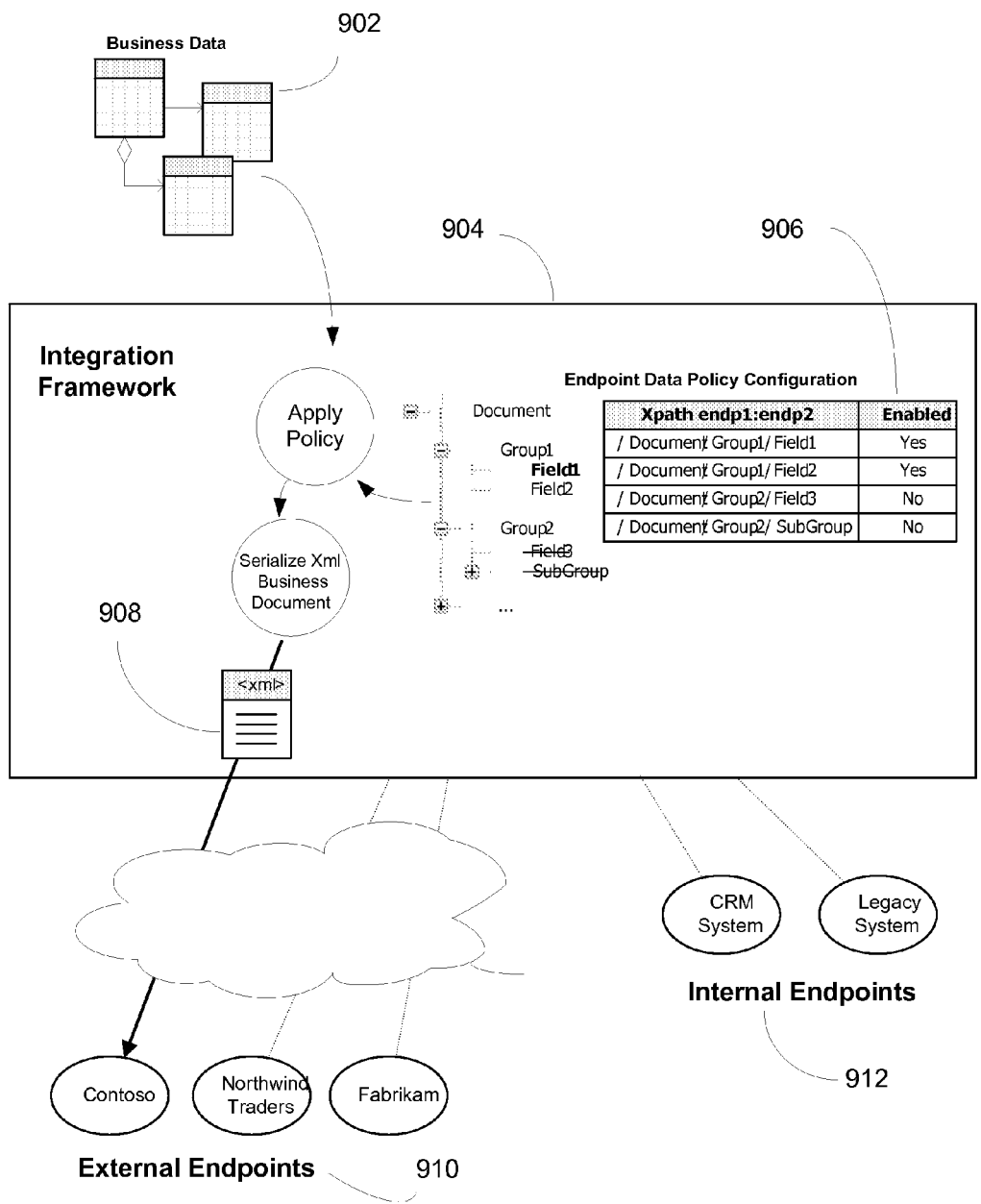
FIG. 9 is an illustration of the method of FIG. 8.

FIG. 8 is a method 800 of applying a business application data policy to outgoing data. At block 802, a schema or other appropriately formatted business data may be received for transmission to an endpoint. Referring briefly to FIG. 9, business data 902 may be generated in a business application and forwarded for transmission. In some embodiments, the business data 902 may be generated internal to the integration framework 904 or may be received via a network (not depicted). In one embodiment, the business data 902 is generated by a well-known internal source, so that the internal endpoint information is readily available. Returning to FIG. 8, at block 804, the internal endpoint information may be known, and the document type and destination endpoint may be extracted from the data received at block 802. At block 806, an appropriate policy schema, such as data policy schema 906 shown in FIG. 9, may be retrieved, using keys corresponding to source endpoint, destination endpoint, and the document type.

At block 810 of FIG. 8, the data policy schema may be used to validate that the document type and specific document are valid for transmission between the source endpoint and the requested destination endpoint. If the endpoint pair is not valid for that document type, the business data 902 may be discarded and, optionally, an error message sent to the source process/endpoint.

If the endpoints and document type are valid, processing may continue at block 812 to verify that each data element conforms to the requirements of the data policy, that is, that each data element required is present and has appropriate values. Further checks may be made to determine if disabled data elements appear. If present, disabled data elements may be removed. However, if required elements are not present or do not conform to required types or values, the yes branch from block 812 may be taken to block 818 and the schema discarded. Optionally, an error message returned to the source endpoint, the destination endpoint, or both.

If the data elements are valid and correct and if only disabled elements are present, the no branch from block 812 may be taken to block 814. Any disabled elements may be removed and, at block 816, the data may be serialized and sent to the destination endpoint across the boundary of the integration framework 904. As shown in FIG. 9, document 908 may be sent to an external endpoint 912, or an internal endpoint 910.

The use of an integration framework, such as an existing integration framework or a specialized one for this purpose, allows a data policy engine to be used to create, maintain and enforce data policies for data in transit between entities. Such entities may be highly friendly, as in related internal business tools, or may have adversarial overtones, such as customer/supplier business integration. The ability to screen and qualify data as it passes an incoming boundary to determine that the required data is present and the ability to screen data as it passes an outbound boundary to determine that only appropriate data is present gives business integration managers a new and powerful tool for managing relationships. Further, because a data manager does not have to constantly customize each business tool as new endpoints are added or changed, costly, and potentially risky, modifications to business critical systems can be avoided.

By placing the data policy engine at critical boundaries between business units and between internal and external trading partner systems, security can be enforced at appropriate points in the network and not applied blindly to all data in transit, avoiding superfluous data handling when no validation or screening is required. Thus, both business managers and data managers benefit from the application of the data policy enforcement provided by the tools and methods described above.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:
1. A method of establishing and enforcing compliance for data transactions, the method comprising:
  analyzing, at a data policy engine operating on a computer, a document schema associated with a document type used by an endpoint pair, the data policy engine operating separately from endpoints of the endpoint pair;
  presenting, by the data policy engine to a first endpoint of the endpoint pair, a representation of all data elements of the document schema;
  receiving, at the data policy engine from the first endpoint, user input selecting one or more data elements of the document schema to be disabled for data transactions with a second endpoint of the endpoint pair;
  establishing, by the data policy engine from the document schema and the user input, a data policy schema for data in transit between the first endpoint and the second endpoint, the data policy schema corresponding to the document type and the endpoint pair;
  examining, by the data policy engine, the data in transit between the first endpoint and the second endpoint after the data in transit crosses a boundary of a source endpoint of the endpoint pair and before the data in transit crosses a boundary of a destination endpoint of the endpoint pair;
  selecting, by the data policy engine, the data policy schema when it is determined that the data in transit between the first endpoint and the second endpoint corresponds to the document type and the endpoint pair; and managing compliance to the data policy schema when the data in transit between the first endpoint and the second endpoint includes data elements of the document schema associated with the document type by:

editing, at the data policy engine, the data in transit between the first endpoint and the second endpoint to remove the one or more data elements of the document schema to be disabled for data transactions with the second endpoint of the endpoint pair from the data in transit; and validating, by the data policy engine, that required information established by the data policy schema for the document type and endpoint pair is present in the data in transit between the first endpoint and the second endpoint, the required information specifying data elements of the document schema associated with the document type that are required for data transactions with the first endpoint of the endpoint pair and data elements of the document schema associated with the document type that are required for data transactions with the second endpoint of the endpoint pair.

2. The method of claim 1, wherein the data policy schema is an XML schema.

3. The method of claim 1, further comprising:
removing, by the data policy engine from the data in transit, named types for any references having no data after removing the one or more data elements of the document schema to be disabled for data transactions with the second endpoint pair.

4. The method of claim 1, further comprising:
receiving, at the data policy engine from the first endpoint, user input selecting the data elements of the document schema associated with the document type that are required for data transactions with the second endpoint of the endpoint pair.

5. The method of claim 1, further comprising:
checking, by the data policy engine, that the data in transit between the first endpoint and the second endpoint is allowed to cross the boundary.

6. The method of claim 1, further comprising:
receiving, at the data policy engine from the first endpoint, user input selecting one or more data elements of the document schema associated with the document type that are allowable for data transactions with the second endpoint of the endpoint pair; and
checking, by the data policy engine, that outbound data from the first endpoint includes only data elements that are required and data elements that are allowable according to the data policy schema for the document type and endpoint pair.

7. The method of claim 1, further comprising:
determining, by the data policy engine, that data transactions between a given endpoint pair are not allowed.

8. The method of claim 1, further comprising:
determining, by the data policy engine, when a data transaction using a particular document type is not allowed with a predetermined destination endpoint.

9. The method of claim 1, further comprising:
establishing, by the data policy engine, a data policy schema for every combination of document type and endpoint pair having allowable transactions.

10. The method of claim 1, wherein the document schema is an XML schema associated with the document type, and a user interface with information corresponding to the XML schema is presented for determining rules for each of the data elements of the document schema.

11. The method of claim 1, wherein the first endpoint of the endpoint pair corresponds to a first business entity and the second endpoint of the endpoint pair corresponds to a second business entity.

12. A computer storage medium storing computer-executable instructions that, when executed, cause a computing device to perform a method of establishing and enforcing compliance for data transactions, the method comprising:

analyzing, at a data policy engine operating on the computing device, a document schema associated with a document type used by an endpoint pair, the data policy engine operating separately from endpoints of the endpoint pair;

presenting, by the data policy engine to a first endpoint of the endpoint pair, a representation of all data elements of the document schema;

receiving, at the data policy engine from the first endpoint, user input selecting one or more data elements of the document schema to be disabled for data transactions with a second endpoint of the endpoint pair;

establishing, by the data policy engine from the document schema and the user input, a data policy schema for data in transit between the first endpoint and the second endpoint, the data policy schema corresponding to the document type and the endpoint pair;

examining, by the data policy engine, the data in transit between the first endpoint and the second endpoint after the data in transit crosses a boundary of a source endpoint of the endpoint pair and before the data in transit enters a boundary of a destination endpoint of the endpoint pair;

selecting, by the data policy engine, the data policy schema when it is determined that the data in transit between the first endpoint and the second endpoint corresponds to the document type and the endpoint pair; and managing compliance to the data policy schema when the data in transit between the first endpoint and the second endpoint includes data elements of the document schema associated with the document type by:

editing, at the data policy engine, the data in transit between the first endpoint and the second endpoint to remove the one or more data elements of the document schema to be disabled for data transactions with the second endpoint of the endpoint pair from the data in transit; and validating, by the data policy engine, that required information established by the data policy schema for the document type and endpoint pair is present in the data in transit between the first endpoint and the second endpoint, the required information specifying data elements of the document schema associated with the document type that are required for data transactions with the first endpoint of the endpoint pair and data elements of the document schema associated with the document type that are required for data transactions with the second endpoint of the endpoint pair.

13. A computing device comprising:
a processor configured to execute computer-executable instructions; and
memory storing computer-executable instructions for establishing and enforcing compliance for data transactions, the computer-executable instructions comprising instructions to:

analyze, at a data policy engine operating on the computing device, a document schema associated with a document type used by an endpoint pair, the data policy engine operating separately from endpoints of the endpoint pair;

present, by the data policy engine to a first endpoint of the endpoint pair, a representation of all data elements of the document schema;

receive, at the data policy engine from the first endpoint, user input selecting one or more data elements of the document schema to be disabled for data transactions with a second endpoint of the endpoint pair;

establish, by the data policy engine from the document schema and the user input, a data policy schema for data in transit between the first endpoint and the second endpoint, the data policy schema corresponding to the document type and the endpoint pair;

examine, by the data policy engine, the data in transit between the first endpoint and the second endpoint after the data in transit crosses a boundary of a source endpoint of the endpoint pair and before the data in transit enters a boundary of a destination endpoint of the endpoint pair;

select, by the data policy engine, the data policy schema when it is determined that the data in transit between the first endpoint and the second endpoint corresponds to the document type and the endpoint pair; and manage compliance to the data policy schema when the data in transit between the first endpoint and the second endpoint includes data elements of the document schema associated with the document type by:

editing, at the data policy engine, the data in transit between the first endpoint and the second endpoint to remove the one or more data elements of the document schema to be disabled for data transactions with the second endpoint of the endpoint pair from the data in transit; and validating, by the data policy engine, that required information established by the data policy schema for the document type and endpoint pair is present in the data in transit between the first endpoint and the second endpoint, the required information specifying data elements of the document schema associated with the document type that are required for data transactions with the first endpoint of the endpoint pair and data elements of the document schema associated with the document type that are required for data transactions with the second endpoint of the endpoint pair.

14. The computing device of claim 13, wherein the data policy schema is an XML schema.

15. The computing device of claim 13, wherein the computer-executable instructions further comprise instructions to:

remove, by the data policy engine from the data in transit, named types for any references having no data after removing the one or more data elements of the document schema to be disabled for data transactions with the second endpoint pair.

16. The computing device of claim 13, wherein the computer-executable instructions further comprise instructions to:

receive, at the data policy engine from the first endpoint, user input selecting the data elements of the document schema associated with the document type that are required for data transactions with the second endpoint of the endpoint pair.

17. The computing device of claim 13, wherein the computer-executable instructions further comprise instructions to:

check, by the data policy engine, that the data in transit between the first endpoint and the second endpoint is allowed to cross the boundary.

18. The computing device of claim 13, wherein the computer-executable instructions further comprise instructions to:

receive, at the data policy engine from the first endpoint, user input selecting one or more data elements of the document schema associated with the document type that are allowable for data transactions with the second endpoint of the endpoint pair; and check, by the data policy engine, that outbound data from the first endpoint includes only data elements that are required and data elements that are allowable according to the data policy schema for the document type and endpoint pair.

19. The computing device of claim 13, wherein the data policy engine is configured to determine when data transactions between a given endpoint pair are not allowed and when a data transaction using a particular document type is not allowed with a predetermined destination endpoint.

20. The computing device of claim 13, wherein the computer-executable instructions further comprise instructions to:

establish, by the data policy engine, a data policy schema for every combination of document type and endpoint pair having allowable transactions.

* * * * *